(12) United States Patent
Zhu et al.

(10) Patent No.: US 10,551,840 B2
(45) Date of Patent: Feb. 4, 2020

(54) PLANNING DRIVEN PERCEPTION SYSTEM FOR AUTONOMOUS DRIVING VEHICLES

(71) Applicant: Baidu USA LLC, Sunnyvale, CA (US)

(72) Inventors: Fan Zhu, Sunnyvale, CA (US); Qi Kong, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 16/025,653

(22) Filed: Jul. 2, 2018

(65) Prior Publication Data

US 2020/0004251 A1    Jan. 2, 2020

(51) Int. Cl.
*G05D 1/02* (2006.01)

(52) U.S. Cl.
CPC ......... *G05D 1/0212* (2013.01); *G05D 1/0231* (2013.01); *G05D 1/0257* (2013.01); *G05D 1/0278* (2013.01); *G05D 2201/0213* (2013.01)

(58) Field of Classification Search
CPC .. G05D 1/0212; G05D 1/0231; G05D 1/0278; G05D 2201/0213; G05D 1/0129; G05D 1/0274; G05D 1/0088; G05D 1/0221; B60W 10/04; B60W 10/18; B60W 10/20; B60W 30/18
See application file for complete search history.

(56) References Cited

U.S. PATENT DOCUMENTS

| 2018/0188060 | A1* | 7/2018 | Wheeler | ............ | G01C 21/3635 |
| 2018/0189578 | A1* | 7/2018 | Yang | .................. | G01C 21/3635 |
| 2019/0113927 | A1* | 4/2019 | Englard | ............. | G01C 21/3492 |

OTHER PUBLICATIONS

Liu et al. Autonomous vehicle planning system design under perception limitation in pedestrian environment, 2015, IEEE, p. 159-166 (Year: 2015).*
Schwesinger et al., Automated valet parking and charging for e-mobility, 2015, IEEE, p. 157-164 (Year: 2016).*
Langari, Autonomous vehicles, 2017, IEEE, p. 4018-4022 (Year: 2017).*
Nunes et al. Guest Editorial Introducing Perception, Planning, and Navigation for Intelligent Vehicles, 2009, IEEE, p. 375-379 (Year: 2009).*
Het et al., Monocular based lane-change on scaled-down autonomous vehicles, 2011, IEEE, 144-149 (Year: 2011) (Year: 2011).*

* cited by examiner

*Primary Examiner* — McDieunel Marc
(74) *Attorney, Agent, or Firm* — Womble Bond Dickinson (US) LLP

(57) ABSTRACT

A perception perceives a driving environment surrounding an ADV based on sensor data obtained from a variety of sensors. Based on the perception data received from the perception module, a planning module is to plan a trajectory for a current driving cycle to drive the ADV. In addition, the planning module determines a driving intent and one or more regions of interest (ROIs) surrounding the ADV based on the trajectory. The driving intent and the ROIs information is then provided to the perception module as a feedback. The perception module can then processing the sensor data from selective sensors to generate the perception data for a next driving cycle. The selected sensors may be determined and selected based on the driving intent and the ROIs, such that the sensor data of the unrelated sensors may be ignored to reduce the computation cost of the perception module.

21 Claims, 10 Drawing Sheets

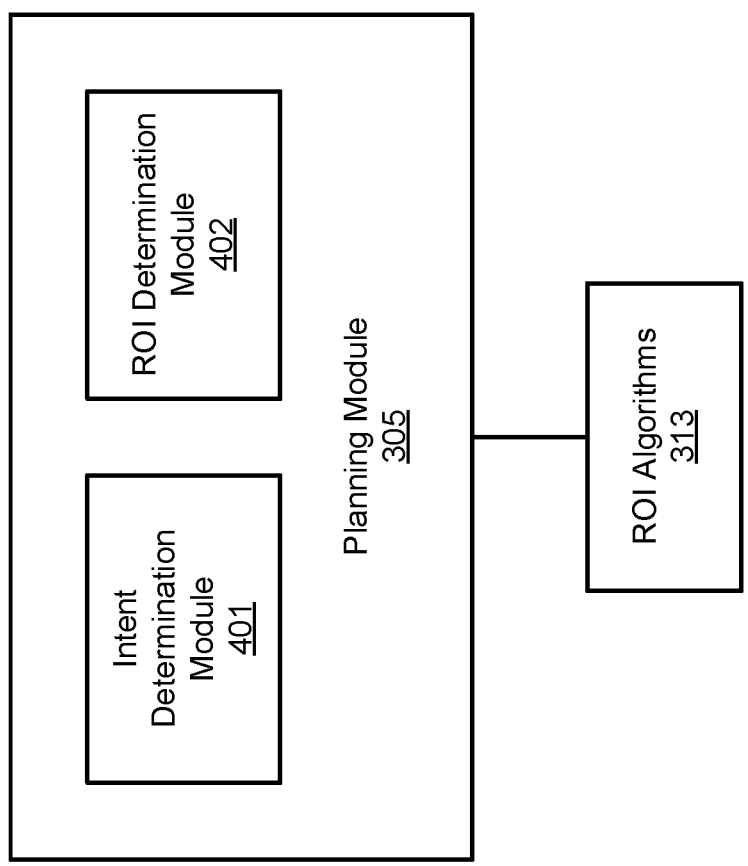

PLANNING DRIVEN PERCEPTION SYSTEM FOR AUTONOMOUS DRIVING VEHICLES

TECHNICAL FIELD

Embodiments of the present disclosure relate generally to operating autonomous vehicles. More particularly, embodiments of the disclosure relate to a perception system of an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Most of the planning and control operations are performed based on sensor data obtained from various sensors such as an inertial measurement unit (IMU), a light detection and range (LIDAR) unit, and RADAR sensors. In addition, multiple and redundant sensors are deployed in ADV but processing those sensors data leads to heavy computational cost. There has been a lack of efficient ways to reduce the computational cost of the sensor data.

BRIEF DESCRIPTION OF THE DRAWINGS

Embodiments of the disclosure are illustrated by way of example and not limitation in the figures of the accompanying drawings in which like references indicate similar elements.

FIG. 4 is a block diagram illustrating an example of a planning module according to one embodiment.

DETAILED DESCRIPTION

Figure 1:
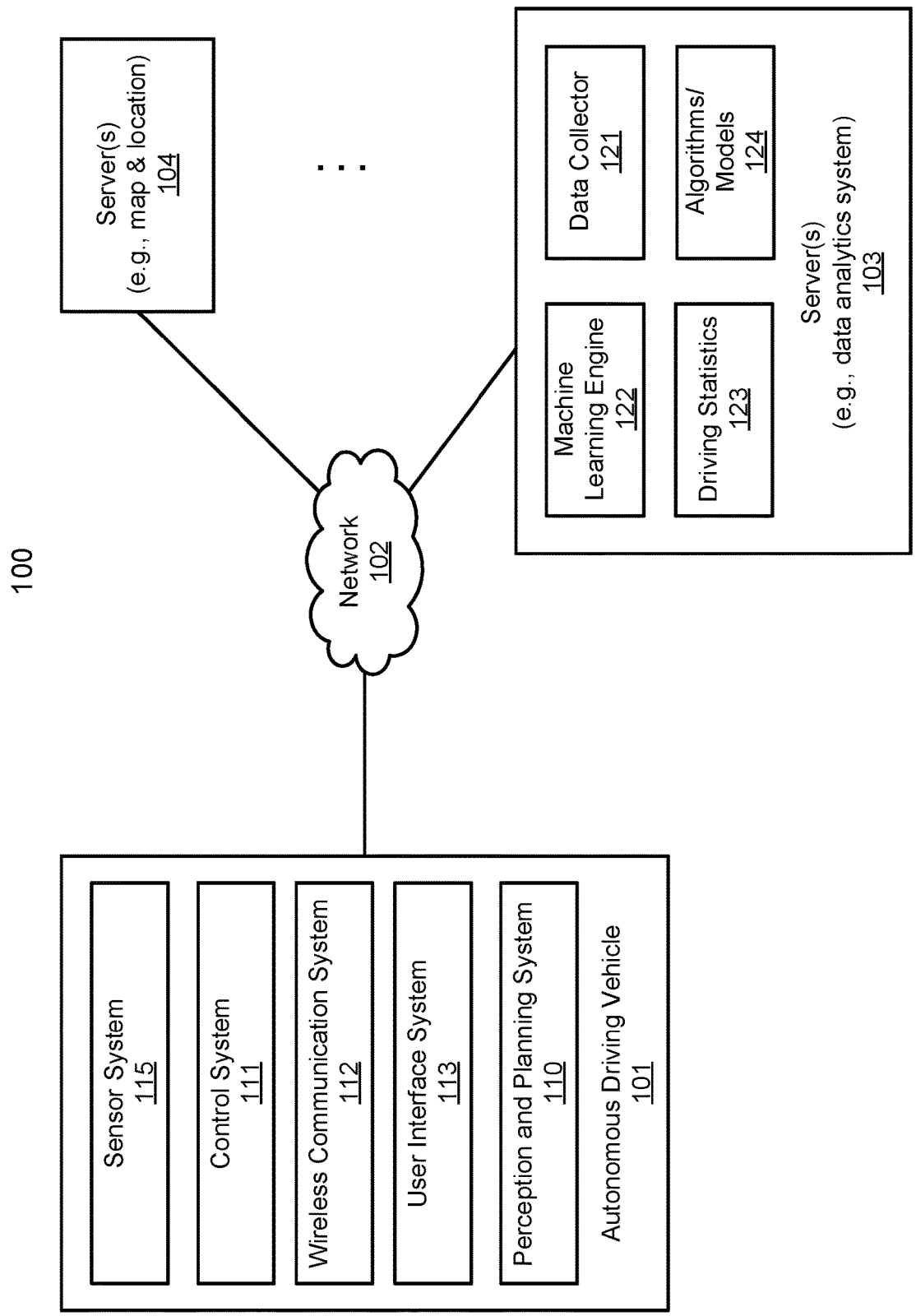
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a perception module perceives a driving environment surrounding an ADV based on sensor data obtained from a variety of sensors, such as LIDAR, IMU, RADAR, and cameras, etc. Based on the perception data received from the perception module, a planning module is to plan a trajectory for a current driving cycle to drive the ADV to move from a first location to a second location. In addition, the planning module determines a driving intent and one or more regions of interest (ROIs) surrounding the ADV based on the trajectory. The driving intent and the ROIs information are then provided to the perception module as a feedback. The perception module can then process the sensor data from selective sensors to generate the perception data for a next driving cycle. The selected sensors may be determined and selected based on the driving intent and the ROIs. Thus, the driving intent and the ROIs may be utilized to identify the sensors that are related to the planning for next cycle, such that the sensor data of the unrelated sensors may be ignored to reduce the computation cost of the perception module.

According to one embodiment, a driving intent can be one of following lane, changing lane, at intersection, nudging to left, nudging to right, merging lane, or moving backwardly. The ROIs include a front region, a back region, a left region, a right region, a front-left region, a front-right region, a back-left region, or a back-right region, which substantially surrounds the ADV.

In one embodiment, in determining a driving intent and one or more ROIs, for each of the ROIs, a distance range of the ROI from a current location of the ADV (e.g., the center of the rear axle) and a scanning angle range of the ROI are calculated. The area of the ROI is defined by the distance range and the scanning angle range. In one embodiment, the distance range is calculated based on a current speed of the ADV and a speed limit of a lane (e.g., a current lane in which the ADV is driving or a cross lane at an intersection). The distance range may be calculated based on a speed value that is calculated based on the current speed of the ADV and the speed limit, and multiplied by a predetermined period of time (e.g., 8 seconds). In a particularly embodiment, the speed value is calculated based on a larger value of the current speed of the ADV or a predetermined percentage (e.g., 150%) of the speed limit. Alternatively, according to another embodiment, the speed value is calculated based on a difference between the current speed of the ADV and a predetermined percentage (e.g., 150%) of the speed limit. Furthermore, the distance range may be calculated based on a distance between the current location of the ADV and a lane boundary of the current lane in which the ADV is driving. Alternatively, the distance range may be calculated further based on a lane width of an adjacent lane.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
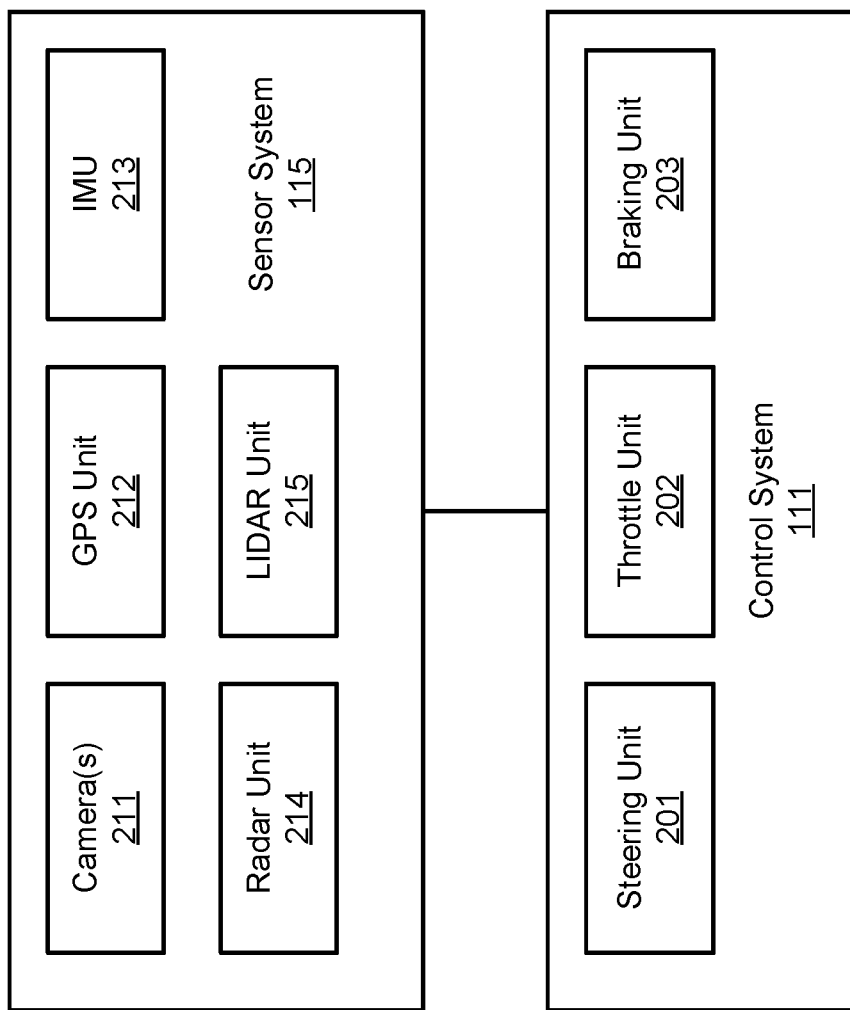
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include algorithms or rules to define the driving intents and the ROIs as described above and to calculating the areas or ranges of the ROIs. Algorithms 124 can then be uploaded on ADVs to be utilized to determine the ROIs during autonomous driving in real-time.

Figure 3A:
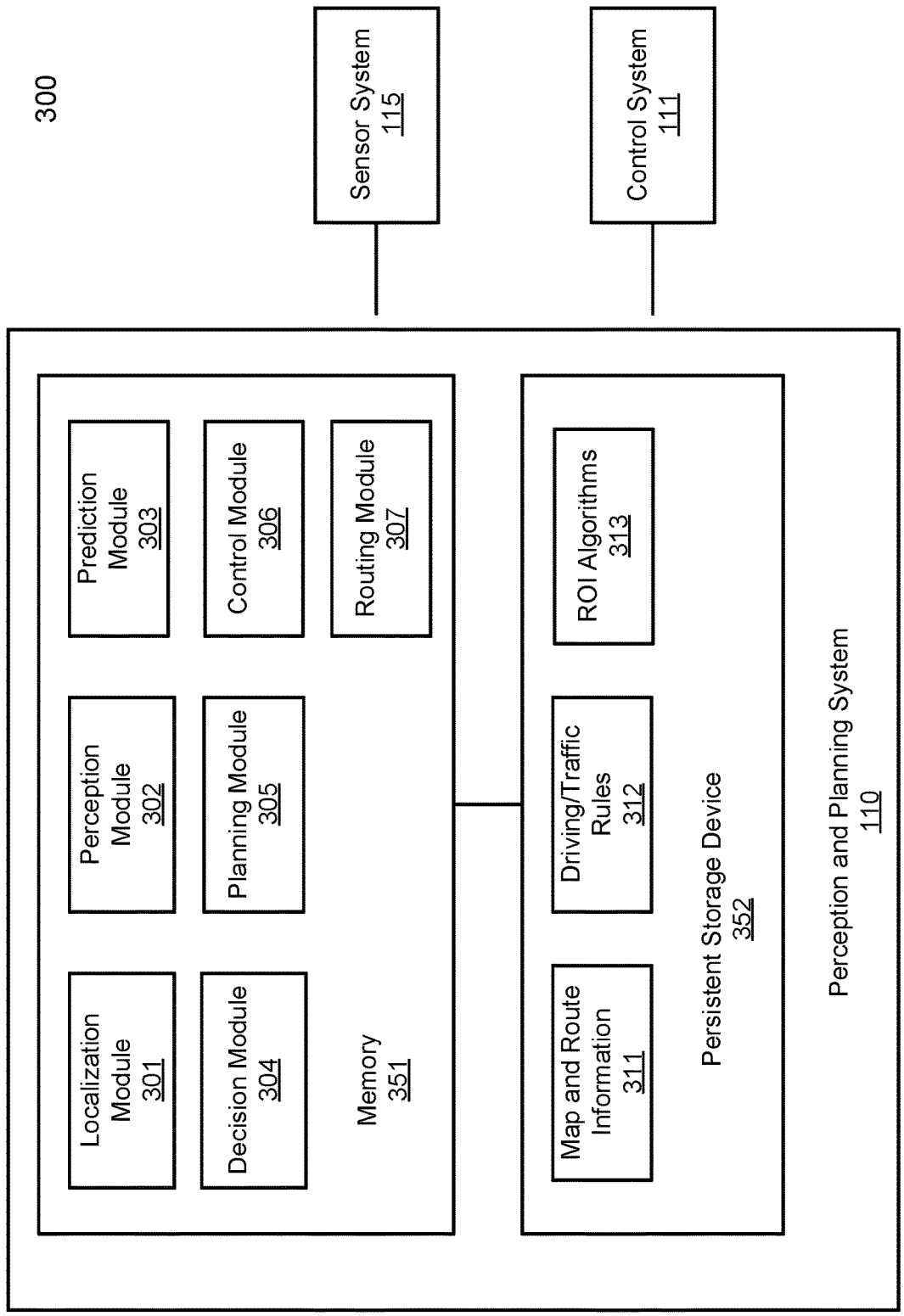
FIGS. 3A-3B are block diagrams illustrating an example of a perception and planning system used with an autonomous vehicle according to one embodiment.
Figure 3B:
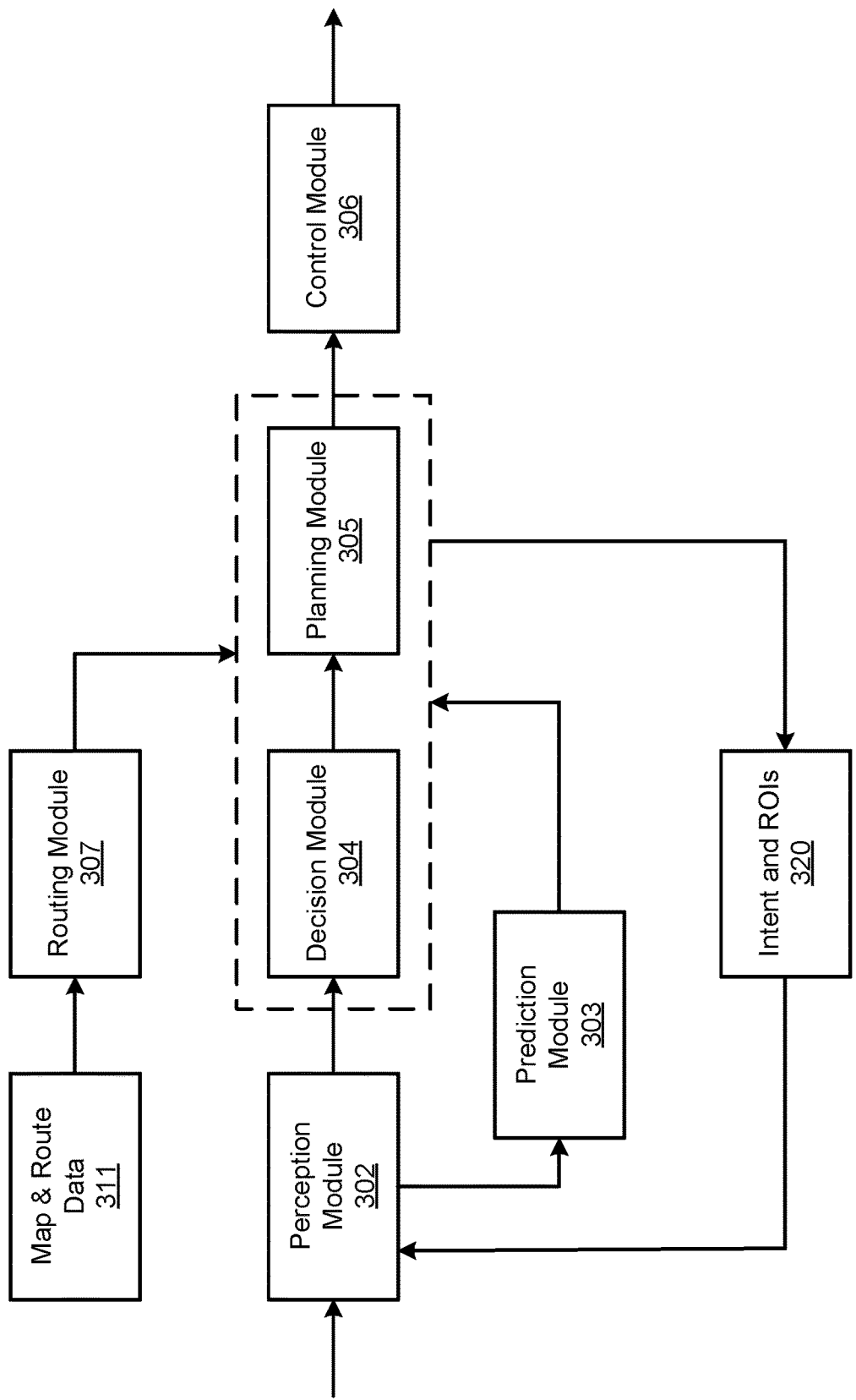

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, perception module 302 perceives a driving environment surrounding ADV 300 based on sensor data obtained from a variety of sensors, such as LIDAR, IMU, RADAR, and cameras, etc. Based on the perception data received from the perception module 302, planning module 305 is configured to plan a trajectory for a current driving cycle to drive ADV 300 to move from a first location to a second location. In addition, the planning module 305 determines a driving intent and one or more regions of interest (ROIs) 320 surrounding the ADV based on the trajectory using ROI determination algorithms 313. The information of driving intent and the ROIs 320 is then provided to the perception module 302 as a feedback. The perception module 302 can then process the sensor data from selective sensors to generate the perception data for a next driving cycle. The selected sensors may be determined and selected based on the driving intent and the ROIs. Thus, the driving intent and the ROIs may be utilized to identify the sensors that are related to the planning for next cycle, such that the sensor data of the unrelated sensors may be ignored to reduce the computation cost of the perception module.

Figure 5:
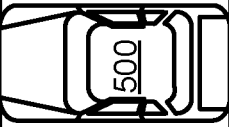
FIG. 5 is a block diagram illustrating an example of a region of interest configuration according to one embodiment.

FIG. 4 is a block diagram illustrating an example of a planning module according to one embodiment. Referring to FIG. 4, planning module 305 includes an intent determination module 401 and a ROI determination module 402. Intent determination module 401 is configured to determine an intent of the ADV based on the trajectory, while ROI determination module 402 is configured to calculate the ROIs using ROI algorithms 313. According to one embodiment, a driving intent can be one of following lane, changing lane, at intersection, nudging to left, nudging to right, merging lane, or moving backwardly. The ROIs include a front region, a back region, a left region, a right region, a front-left region, a front-right region, a back-left region, or a back-right region, which substantially surrounds the ADV as shown in FIG. 5. ROI determination module 402 may further include individual ROI sub-modules to calculate the individual ROIs. For example, ROI determination module 402 may include a front region calculator, a back region calculator, a left region calculator, a right region calculator, a front-left region calculator, a front-right region calculator, a back-left region calculator, and a back-right region calculator (not shown) to calculate a front region, a back region, a left region, a right region, a front-left region, a front-right region, a back-left region, and a back-right region, respectively.

Referring now to FIG. 5, according to one embodiment, the ROIs include at least a front-left ROI 501, front ROI 502, front-right ROI 503, left ROI 504, right ROI 505, back-left ROI 506, back ROI 507, and back-right ROI 508 that surround ADV 500. For each of the ROIs 501-508, ROI determination module 402 is configured to determine the area of the ROI using a specific algorithm for the ROI. Each of ROIs 501-508 may be associated with the same or a different ROI determination algorithm. Each ROI includes an area that is defined by a distance range and a range of scanning angles.

In one embodiment, the scanning angle range of an ROI is calculated by adding a predetermined angle margin to the outmost edge of a block representing the ROI. In a particular embodiment, the predetermined angle margin is approximately +/−15 degrees. In one embodiment, a block representing an ROI is a square block or a rectangular block having a size corresponding to a vehicle length of the ADV. For example, the length of the longer or longest edge of the block is at least the vehicle length. By adding +/−angle margin, at least the adjacent ROIs are overlapped to ensure the ROIs cover all possible areas surrounding the ADV. For a particular ROI, dependent upon the location of the ROI and/or the driving intent with respect to the ADV, the distance range and/or scanning angles may be determined differently.

Figure 6:
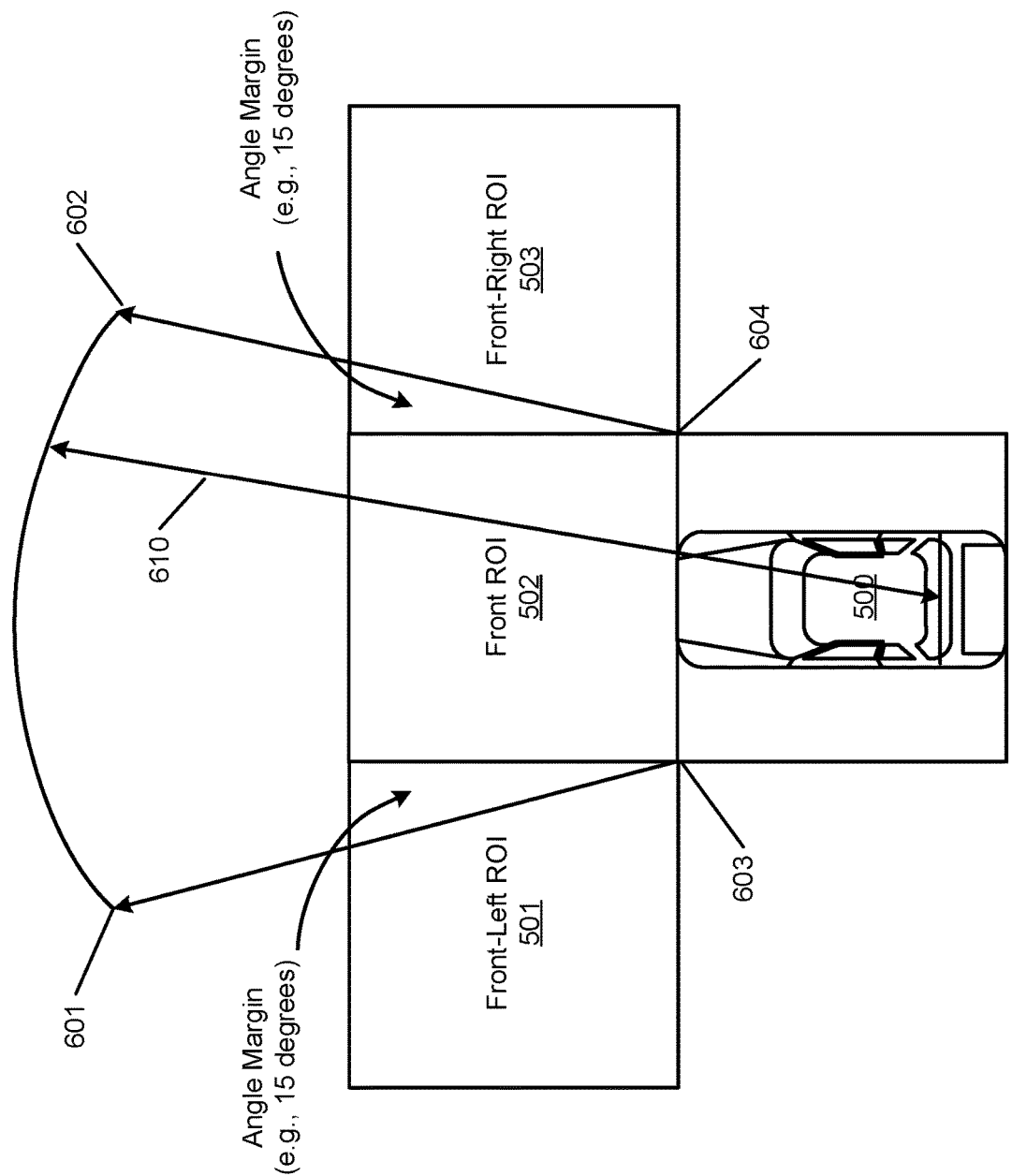
FIG. 6 is a block diagram illustrating a process of determining a region of interest according to one embodiment.

For example, for a front ROI as shown in FIG. 6, +/−15 degrees are added as angle margin to the outmost edge of block 502. Thus, the area of the front ROI associated with block 502 can defined by edges and curve connected through points or corners 601-604, and a distance range 610. Distance range 610 may be calculated dependent upon the driving intent at the point in time. For front ROI 502, according to one embodiment, the distance range 610 may be calculated based on a current speed of ADV 500 and a speed limit of a lane in which ADV 500 is driving. The distance range 610 may be calculated based on a speed value that is calculated based on the current speed of the ADV and the speed limit, and multiplied by a predetermined period of time (e.g., 8 seconds). In a particularly embodiment, the speed value is calculated based on a larger value of the current speed of the ADV and a predetermined percentage of the speed limit, such as, for example, distance range=max (150% speed limit, current speed of ADV)*8 seconds. The front ROI 502 is typically utilized when the driving intent is to follow the current lane or changing lane. The speed limit of a lane can be obtained from the map data of a map corresponding to related lane or lanes.

The angle range for back ROI 507 can be determined similar to the angle range of front ROI 502. In one embodiment, the distance range of the back ROI 507 is determined based on a difference between the speed limit and the current speed of the ADV, multiplied by a predetermined period of time (e.g., 8 seconds). In a particular embodiment, the distance range of back ROI 507 can be determined based on a difference between a predetermined percentage of the speed limit and the current speed of the ADV, multiplied by the predetermined time period, such as, for example, distance range=(150%*speed limit−current speed of ADV)*8 seconds. The back ROI 507 is typically utilized when the driving intent is to move backwardly.

The angle range for left ROI 504 and right ROI 505 can be determined using a similar algorithm as of determining the angle range for front ROI 502 or back ROI 507. The distance range for the left ROI 504 and right ROI 505 may be determined dependent upon the corresponding driving intent. For example, if the driving intent is at an intersection, according to one embodiment, the distance range for the left ROI 504 or right ROI 505 can be calculated based on the speed limit of the cross lane. In a particular embodiment, the distance range for the left ROI 504 or right ROI 505 at the intersection can be calculated based on a predetermined percentage (e.g., 150%) of the speed limit of the cross lane multiplied by a predetermined time period (e.g., 8 seconds), such as, for example, distance range=150% speed limit*8 seconds.

When the driving intent is to change lane, the distance range for the left ROI 504 and right ROI 505 can be different. For example, when the driving intent is to change lane to left, according to one embodiment, the distance range for the left ROI 504 is calculated based on a distance between the current location of the ADV (e.g., center of the rear axle of the ADV) and the left boundary of the current lane, and the lane width of an adjacent lane on the left. In a particular embodiment, the distance for the left ROI 504 can be determined as follows: distance range=distance to the left boundary of the current lane+lane width of the adjacent lane on the left+an additional margin. In one embodiment, the additional margin is approximately one meter. The lane width and the distance between the ADV and the boundary of a lane can be measured using a variety of sensors, such as, LIDAR, cameras, ultrasonic sensors, etc. Similarly, for the driving intent of lane changing to right, the distance range for the right ROI 505 can be determined using the similar techniques.

When the driving intent is to nudge to left within the current lane, according to one embodiment, the distance range for the left ROI 504 can be determined based on a distance between the current location of the ADV and a left boundary of the current lane. Specifically, in a particular embodiment, the distance range for the left ROI 504 can be determined as follows: distance range=distance between ADV and left boundary of the current lane+additional buffer (e.g., 1 meter). Similarly, for the driving intent of nudging to right, the distance range for the right ROI 505 is determined using the similar techniques.

Figure 7:
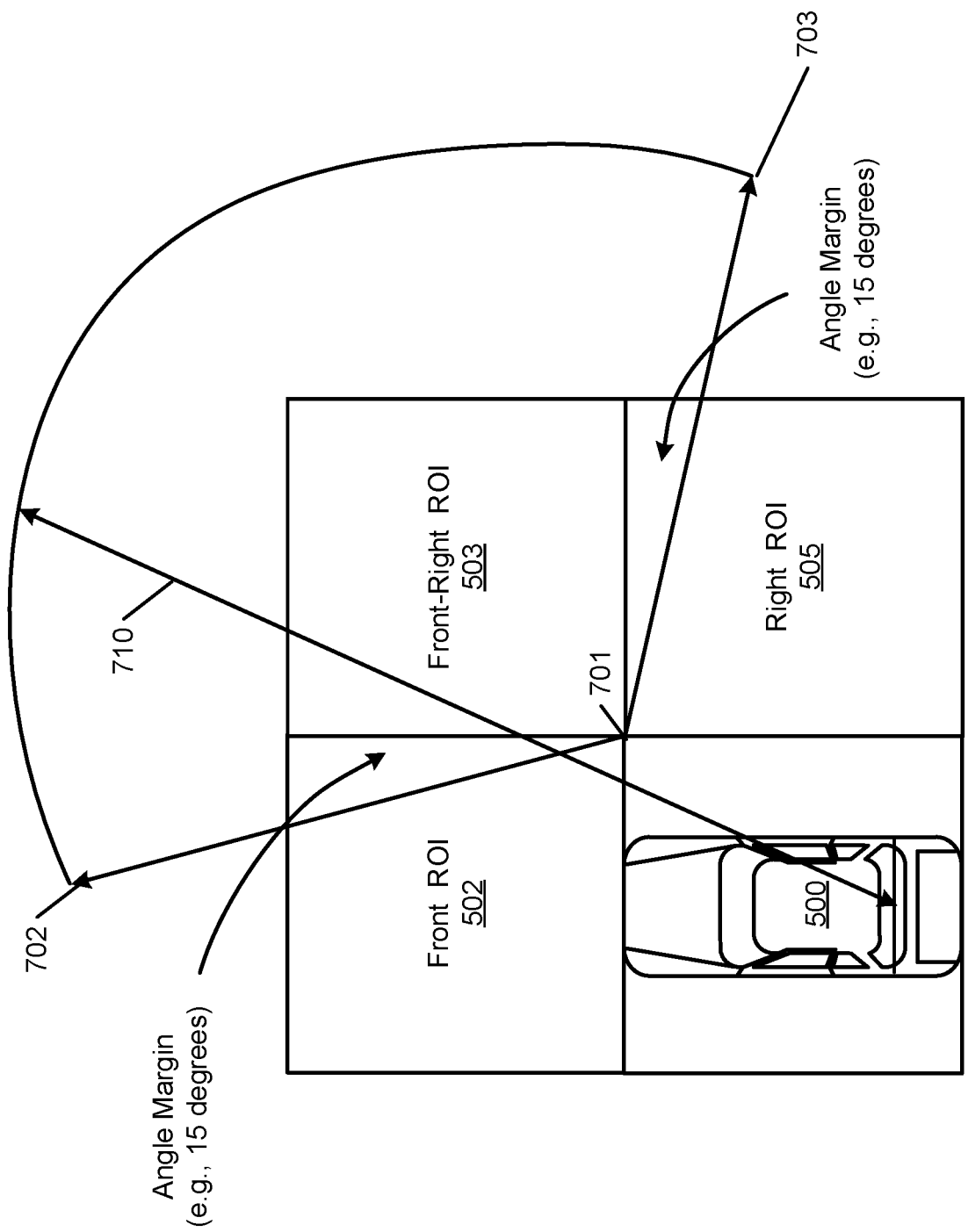
FIG. 7 is a block diagram illustrating a process of determining a region of interest according to another embodiment.

The angle range for front-left ROI 501, front-right ROI 502, back-left ROI 506, and back-right ROI 508 can be determined similar to front ROI 502 as shown in FIG. 6 and described above. Referring now to FIG. 7, in determining the angle range for front-right ROI 503, +/−15 degrees are added from the outmost edges of block 503. The area of ROI is defined by the boundaries through points 701-703. According to one embodiment, the distance range 710 from the ADV (e.g., center of the rear axle) to the curve 704 is determined based on the distance ranges of the adjacent ROIs, in this example, ROI 502 and ROI 505. As described above, the distance ranges of ROI 502 and ROI 505 can be determined based on the driving intent at the point in time. In one embodiment, the distance range for front-right ROI 503 is determined based on the larger distance range of the adjacent ROIs, in this example, front ROI 503 and right ROI 505. The distance ranges for front-left ROI 501, back-left ROI 506, and back-right ROI 508 can be determined using the techniques similar to the above.

When the driving intent and the ROI information are received by the perception module, the perception module can selectively process the sensors data from the sensors associated with the driving intent and the ROIs. For example, when the driving intent is to follow the current lane, the perception module will focus more on the sensor data obtained from the sensors covering front-left ROI 501, front ROI 502, and front right ROI 503. When the driving intent is to change lane from the current lane to the left adjacent lane, the perception module will pay more attention to the sensor data obtained from the sensors covering the front-right ROI 501, front ROI 502, front-right ROI 503, left ROI 504, and back-left ROI 506.

Figure 8:
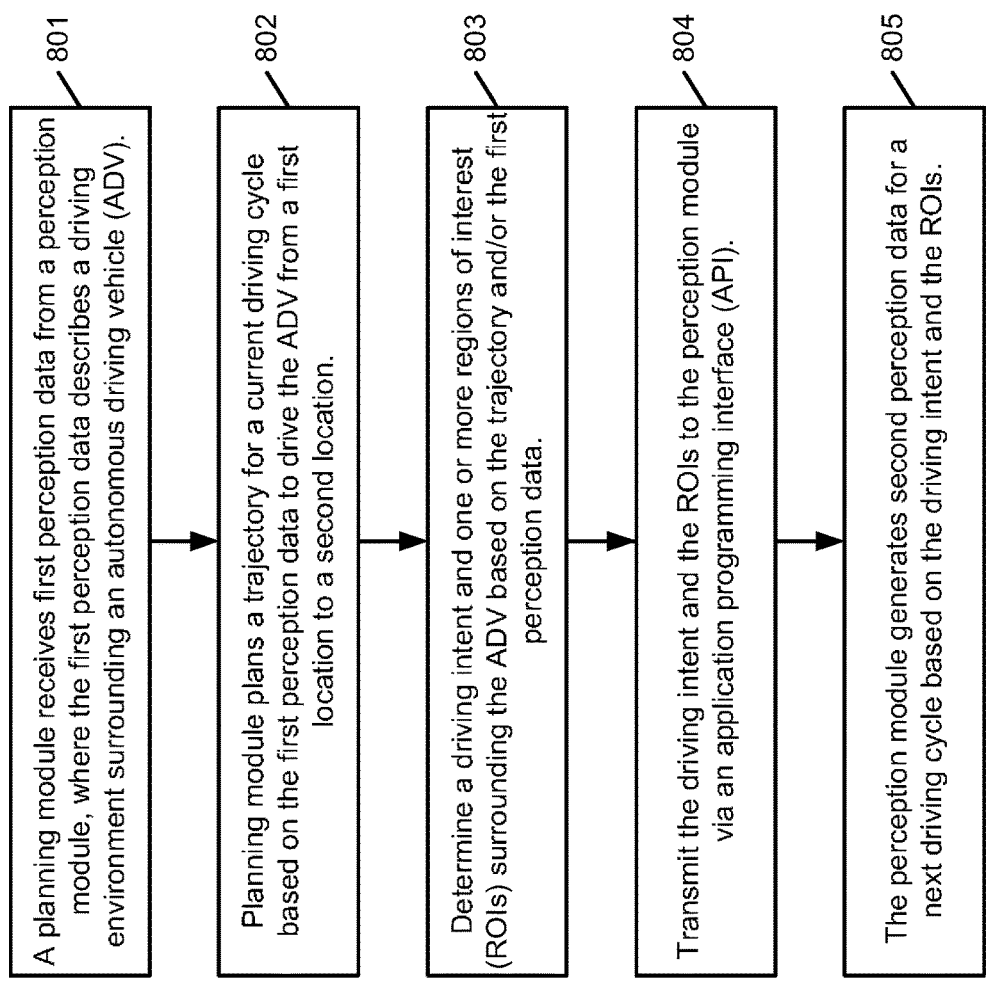
FIG. 8 is a flow diagram illustrating a process of operating an autonomous driving vehicle according to one embodiment.

FIG. 8 is a flow diagram illustrating a process of operating an autonomous driving vehicle according to one embodiment. Process 800 may be performed by processing logic which may include software, hardware, or a combination thereof. For example, process 800 may be performed by perception module 302 and planning module 305. Referring to FIG. 8, in operation 801, a planning module of an ADV receives first reception data from a perception module. The first perception data was generated by the perception module based on sensor data obtained from a variety of sensors as described above. The first perception data describes the driving environment surrounding the ADV. In operation 802, the planning module plans a trajectory for a current driving cycle based on the first perception data to drive the ADV from a first location to a second location. In operation 803, the planning module determines a driving intent and one or more ROIs based on the trajectory and/or the first perception data. In operation 804, the planning module transmits the driving intent and the ROIs to the perception module via an API. In operation 805, the perception module generates second perception data for a next driving cycle based on the driving intent and the ROIs. For example, the perception module may selectively process sensor data from certain sensors based on the driving intent and the ROI information, which in turn reduces the computation cost.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
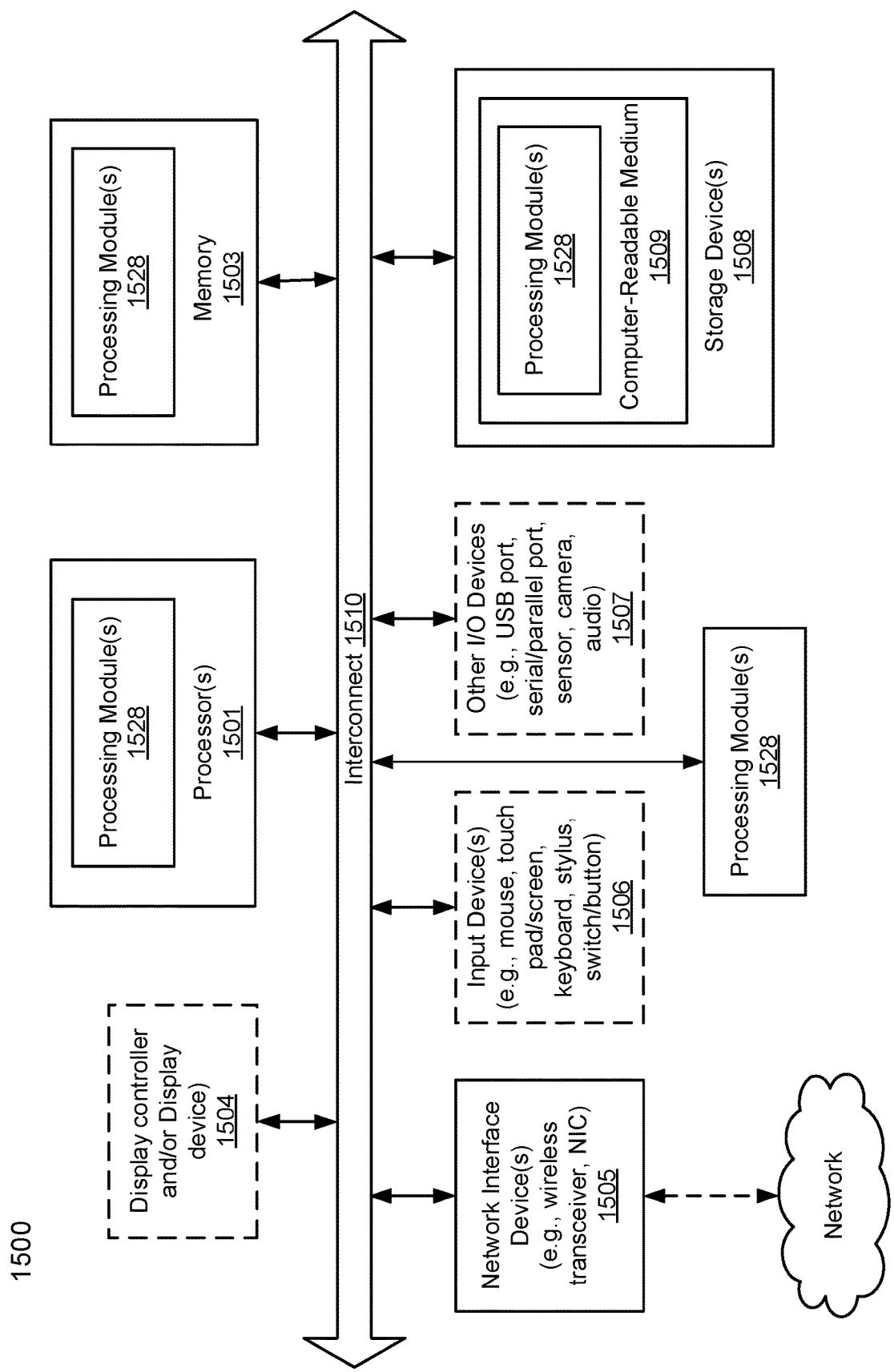
FIG. 9 is a block diagram illustrating a data processing system according to one embodiment.

FIG. 9 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS/iOS from Apple, Android® from Google®, LINUX, UNIX, or other real-time or embedded operating systems.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC).

The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305 and/or control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
    receiving, by a planning module, first perception data from a perception module, the first reception data describing a driving environment surrounding an autonomous driving vehicle (ADV);
    planning, by the planning module, a trajectory for a current driving cycle based on the first perception data to drive the ADV from a first location to a second location;
    determining a driving intent and one or more regions of interest (ROIs) surrounding the ADV based on the trajectory;
    transmitting the driving intent and the ROIs to the perception module via an application programming interface (API);
    generating, by the perception module, second perception data for a next driving cycle based on the driving intent and the ROIs; and
    selectively processing sensor data from certain sensors associated with the ADV based on the driving intent and the ROIs.

2. The method of claim 1, wherein the driving intent is one of following lane, changing lane, at intersection, nudging to left, nudging to right, merging lane, or moving backwardly.

3. The method of claim 1, wherein one or more regions of interest comprise a front region, a back region, a left region, a right region, a front-left region, a front-right region, a back-left region, or a back-right region.

4. The method of claim 1, wherein determining a driving intent and one or more regions of interest comprises:
    for each of the regions of interest, calculating a distance range of the ROI from a current location of the ADV; and
    calculating a scanning angle range of the ROI, wherein the ROI is defined by an area calculated based on the distance range and the scanning angle range.

5. The method of claim 4, wherein the distance range is calculated based on a current speed of the ADV in view of a speed limit of a lane.

6. The method of claim 5, wherein the distance range is calculated based on a speed value calculated based on the current speed of the ADV and the speed limit, multiplied by a predetermined period of time.

7. The method of claim 6, wherein the speed value is calculated based on a larger value of the current speed of the ADV and a predetermined percentage of the speed limit.

8. The method of claim 6, wherein the speed value is calculated based on a difference between the current speed of the ADV and a predetermined percentage of the speed limit.

9. The method of claim 4, wherein the distance range is calculated based on a distance between the current location of the ADV and a lane boundary of a current lane within which the ADV is driving.

10. The method of claim 9, wherein the distance range is calculated further based on a lane width of an adjacent lane.

11. A non-transitory machine-readable medium having instructions stored therein, which when executed by a processor, cause the processor to perform operations, the operations comprising:
    receiving, by a planning module, first perception data from a perception module, the first reception data describing a driving environment surrounding an autonomous driving vehicle (ADV);
    planning, by the planning module, a trajectory for a current driving cycle based on the first perception data to drive the ADV from a first location to a second location;
    determining a driving intent and one or more regions of interest (ROIs) surrounding the ADV based on the trajectory;
    transmitting the driving intent and the ROIs to the perception module via an application programming interface (API);
    generating, by the perception module, second perception data for a next driving cycle based on the driving intent and the ROIs; and
    selectively processing sensor data from certain sensors associated with the ADV based on the driving intent and the ROIs.

12. The machine-readable medium of claim 11, wherein the driving intent is one of following lane, changing lane, at intersection, nudging to left, nudging to right, merging lane, or moving backwardly.

13. The machine-readable medium of claim 11, wherein one or more regions of interest comprise a front region, a back region, a left region, a right region, a front-left region, a front-right region, a back-left region, or a back-right region.

14. The machine-readable medium of claim 11, wherein determining a driving intent and one or more regions of interest comprises:
    for each of the regions of interest, calculating a distance range of the ROI from a current location of the ADV; and calculating a scanning angle range of the ROI, wherein the ROI is defined by an area calculated based on the distance range and the scanning angle range.

15. The machine-readable medium of claim 14, wherein the distance range is calculated based on a current speed of the ADV in view of a speed limit of a lane.

16. The machine-readable medium of claim 15, wherein the distance range is calculated based on a speed value calculated based on the current speed of the ADV and the speed limit, multiplied by a predetermined period of time.

17. The machine-readable medium of claim 16, wherein the speed value is calculated based on a larger value of the current speed of the ADV and a predetermined percentage of the speed limit.

18. The machine-readable medium of claim 16, wherein the speed value is calculated based on a difference between the current speed of the ADV and a predetermined percentage of the speed limit.

19. The machine-readable medium of claim 14, wherein the distance range is calculated based on a distance between the current location of the ADV and a lane boundary of a current lane within which the ADV is driving.

20. The machine-readable medium of claim 19, wherein the distance range is calculated further based on a lane width of an adjacent lane.

21. A data processing system, comprising:
a processor; and
a memory coupled to the processor to store instructions, which when executed by the processor, cause the processor to perform operations, the operations including:
receiving, by a planning module, first perception data from a perception module, the first reception data describing a driving environment surrounding an autonomous driving vehicle (ADV),
planning, by the planning module, a trajectory for a current driving cycle based on the first perception data to drive the ADV from a first location to a second location,
determining a driving intent and one or more regions of interest (ROIs) surrounding the ADV based on the trajectory,
transmitting the driving intent and the ROIs to the perception module via an application programming interface (API),
generating, by the perception module, second perception data for a next driving cycle based on the driving intent and the ROIs, and
selectively processing sensor data from certain sensors associated with the ADV based on the driving intent and the ROIs.

* * * * *